No. 854,738. PATENTED MAY 28, 1907.
H. J. HASS.
LIQUID FILTER.
APPLICATION FILED SEPT. 15, 1906.

Witnesses:
Richard Sommer
Louis W. Gratz

Herman J. Hass, Inventor
by Geyer & Popp
Attorneys

UNITED STATES PATENT OFFICE.

HERMAN J. HASS, OF BUFFALO, NEW YORK, ASSIGNOR TO E. R. THOMAS MOTOR COMPANY, OF BUFFALO, NEW YORK.

LIQUID-FILTER.

No. 854,738.　　　Specification of Letters Patent.　　　Patented May 28, 1907.

Application filed September 15, 1906. Serial No. 334,814.

*To all whom it may concern:*

Be it known that I, HERMAN J. HASS, a citizen of the United States, residing at Buffalo, in the county of Erie and State of New York, have invented a new and useful Improvement in Liquid-Filters, of which the following is a specification.

This invention relates to filters or strainers which are more particularly designed for removing impurities from gasolene before the same is delivered to gas engines.

The object of this invention is to produce a filter or strainer for this purpose which is comparatively simple in construction, which has a large capacity and not liable to become inoperative and which can be readily cleaned when necessary.

Figure 1:
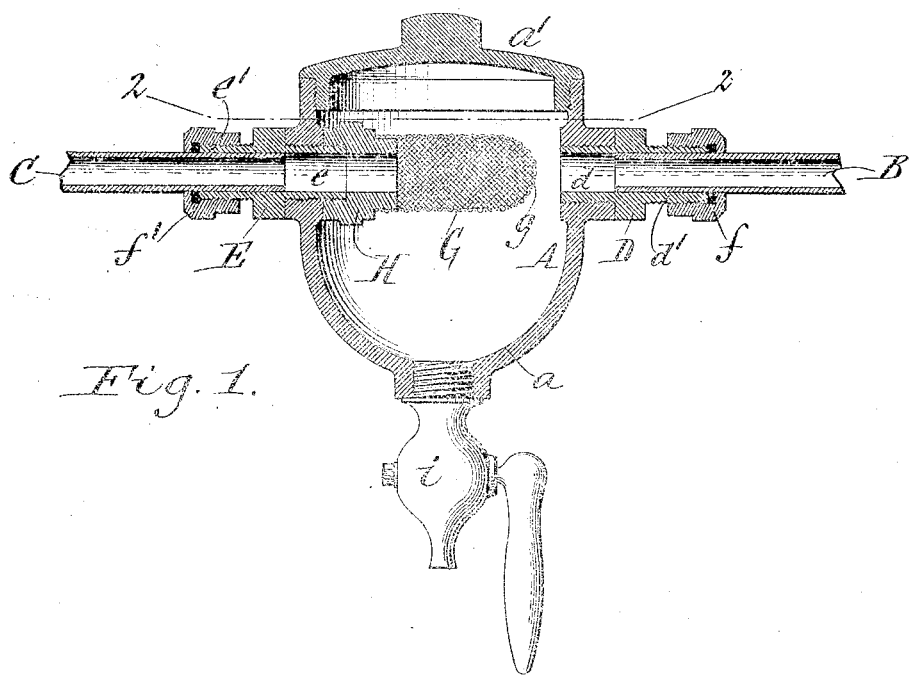
Figure 2:
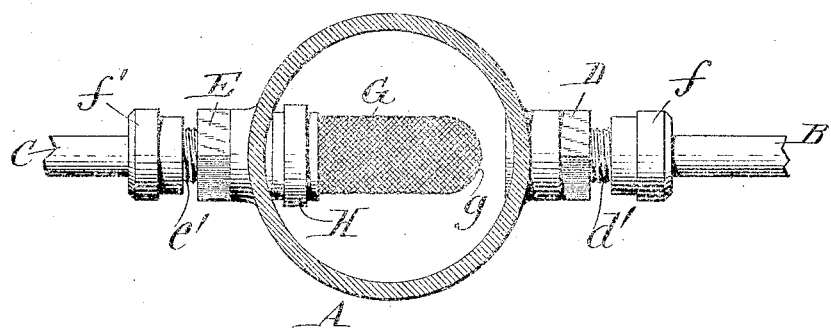

In the accompanying drawings: Figure 1 is a vertical longitudinal section of my improved filter or strainer. Fig. 2 is a horizontal section thereof in line 2—2 Fig. 1.

Similar letters of reference indicate corresponding parts in both figures.

A represents the hollow body or separating chamber of the filter or strainer which preferably has a semi-spherical body $a$ and a removable cover $a^1$ which normally closes an opening in the top of the chamber which is of a diameter equal to the bore of said chamber.

B, C represent the inlet and outlet pipes whereby the gasolene or other liquid to be filtered or strained is conducted into the separating chamber and drawn off therefrom. These pipes are connected with the upper part of the separating chamber and preferably arranged horizontally in line and diametrically opposite each other. The connection between these pipes and the separating chamber may be effected in various ways, the means, shown in the drawings, for this purpose being preferred and consisting of inlet and outlet coupling nipples D, E which receive the inlet and outlet pipes, respectively, and having inner screw threaded ends $d$, $e$ which engage with threaded openings in opposite sides of the separating chamber, and outer threaded ends $d^1$, $e^1$ which receive the packing nuts $f$, $f^1$ of the stuffing boxes whereby tight joints are produced between the coupling nipples and the inlet and outlet pipes.

The nipple of the inlet pipe preferably terminates flush or nearly so with the inner side of the separating chamber but the nipple of the delivery or outlet pipe projects inwardly beyond the inner side of the separating chamber and serves as part of the means for supporting the screen whereby the liquid is filtered or strained in passing from the separating chamber to the outlet pipe. This screen is preferably constructed of woven wire, gauze or other foraminous material in the form of a cylindrical body G having a semi-spherical head $g$ at one end. The opposite end of the body of the screen is secured to a coupling sleeve H which has a screw connection with the inner end of the outlet nipple E. In the assembled position of the parts the screen is arranged horizontally with its body in the upper part of the separating chamber and axially in line with the inlet and outlet pipes and with its head adjacent to the inlet nipple.

When the filter or strainer is in use the liquid passes from the inlet pipe into the separating chamber, thence through the screen and out through the outlet pipe. As the liquid enters the separating chamber from the inlet pipe any heavy impurities contained therein are separated therefrom by gravity and collect on the bottom of the separating chamber from which the sediment may be removed or drained off from time to time by a blow-off valve or drain cock $i$ connected with the bottom of the separating chamber. As the liquid passes through the screen any light impurities, such as threads and small pieces of straw or wood, are separated therefrom which impurities may be removed from time to time, access for this purpose being had to the interior of the separating chamber by removing the cover at the upper end thereof.

By constructing the screen of tubular form having a body and head of the same material a very large separating surface is produced which is not likely to become wholly clogged by accumulations of light impurities thereon and all parts of the same, can also be readily and quickly cleaned when necessary.

I claim as my invention:

1. A liquid filter comprising a separating chamber, inlet and outlet pipes each connected with said chamber by a nipple which screws into an opening in the side of the chamber while its outer end receives the respective pipe, and a packing nut applied to the outer end of said nipple and around said pipe, and a screen arranged over the outlet nipple within the separating chamber, substantially as set forth.

2. A liquid filter comprising a separating chamber, inlet and outlet pipes each connected with said chamber by a nipple which screws into an opening in the side of the chamber while its outer end receives the respective pipe, and a packing nut applied to the outer end of said nipple and around said pipe, a screen having a cylindrical body arranged horizontally within the chamber and a semi-spherical head at one end, and a coupling sleeve which has a screw connection with the inner end of the nipple of the outlet pipe and is connected with the opposite end of the body of the screen, substantially as set forth.

Witness my hand this 10th day of September, 1906.

HERMAN J. HASS.

Witnesses:
  N. H. FLOWERS,
  THEO. L. POPP.